United States Patent
Hassan et al.

(10) Patent No.: US 9,715,892 B1
(45) Date of Patent: Jul. 25, 2017

(54) DATA READER SHIELD SEED BUFFER

(71) Applicant: Seagate Technology LLC, Cupertino, CA (US)

(72) Inventors: Sameh Sayad Ali Hassan, Londonderry (GB); Patrick G. McCafferty, Londonderry (GB); Marcus W. Ormston, Londonderry (GB); Kevin A. McNeill, Londonderry (GB)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/220,797

(22) Filed: Jul. 27, 2016

Related U.S. Application Data

(60) Provisional application No. 62/199,684, filed on Jul. 31, 2015.

(51) Int. Cl.
*G11B 5/39* (2006.01)
*G11B 5/60* (2006.01)

(52) U.S. Cl.
CPC .............. *G11B 5/6082* (2013.01); *G11B 5/39* (2013.01); *G11B 5/3912* (2013.01)

(58) Field of Classification Search
CPC .................................................. G11B 5/3912
USPC .................................. 360/320, 324.1, 324.11
See application file for complete search history.

(56) References Cited

U.S. PATENT DOCUMENTS

| | | | |
|---|---|---|---|
| 7,092,221 B2 | 8/2006 | Gill | |
| 7,839,608 B2* | 11/2010 | Kamai | B82Y 25/00 360/324.2 |
| 8,395,867 B2 | 3/2013 | Dimitrov et al. | |
| 8,462,469 B1* | 6/2013 | Kanaya | G11B 5/3932 360/324.12 |
| 8,582,249 B2 | 11/2013 | Sapozhnikov et al. | |
| 8,675,318 B1 | 3/2014 | Ho et al. | |
| 8,711,528 B1 | 4/2014 | Xiao et al. | |
| 9,007,729 B1 | 4/2015 | Ho et al. | |
| 9,318,133 B2 | 4/2016 | Freitag et al. | |
| 2005/0068693 A1* | 3/2005 | Freitag | G11B 5/332 360/324.11 |
| 2005/0141146 A1* | 6/2005 | Pinarbasi | B82Y 10/00 360/324.1 |
| 2009/0251829 A1* | 10/2009 | Zhang | B82Y 10/00 360/319 |
| 2014/0218821 A1* | 8/2014 | Lu | G01R 33/093 360/110 |
| 2015/0008550 A1* | 1/2015 | Min | H01F 10/32 257/421 |
| 2015/0103438 A1* | 4/2015 | Lu | G01R 33/093 360/119.03 |
| 2015/0221326 A1* | 8/2015 | Jung | G11B 5/332 360/328 |

* cited by examiner

*Primary Examiner* — Jefferson Evans
(74) *Attorney, Agent, or Firm* — Hall Estill Attorneys at Law

(57) ABSTRACT

A data reader can be configured with at least a magnetoresistive stack contacting one or more magnetic shields. The magnetoresistive stack can be separated from a magnetic shield by a seed lamination on an air bearing surface with the seed lamination consisting of at least three sub-layers that are constructed with different material compositions.

20 Claims, 3 Drawing Sheets

DATA READER SHIELD SEED BUFFER

RELATED APPLICATION

The present application makes a claim of domestic priority to U.S. Provisional Patent Application No. 62/199,684 filed Jul. 31, 2015, the contents of which are hereby incorporated by reference.

SUMMARY

A data reader, in accordance with some embodiments, at least a magnetoresistive stack separated from a magnetic shield by a seed lamination on an air bearing surface with the seed lamination consisting of at least three sub-layers that are constructed with different material compositions.

DETAILED DESCRIPTION

To increase data capacity of data storage devices, various data access components, such as a data reader portion of a transducing head, have reduced physical size. Such smaller data access components can correspond with increased noise and degraded data reading accuracy despite the presence of magnetic shields. In order to suppress noise, a magnetic shield can be positioned proximal a data access component and configured to absorb magnetic flux while maintaining a magnetic orientation and stable domain structure. However, reduced physical size and increased proximity of magnetic shields to magnetically sensitive aspects of the data access component can jeopardize the ability of a shield to provide sufficient linear data resolution while providing a stable magnetic configuration.

In various embodiments, a magnetic shield is buffered from a magnetoresistive stack of a data reader by a seed lamination that can utilize a high magnetic moment material that provides low seed coercivity, high anisotropy, and high magnetic pinning strength while maintaining stable magnetic orientation and domain structure when absorbing stray magnetic fields. The tuned configuration of the seed lamination increases magnetic flux absorption without significantly increasing coercivity of the magnetic shield. The ability to utilize the seed lamination in data readers with pinning structures positioned either on an air bearing surface (ABS) or recessed from the ABS can accommodate a diverse variety of data storage environments, such as high data density hard disk drives.

Figure 1:
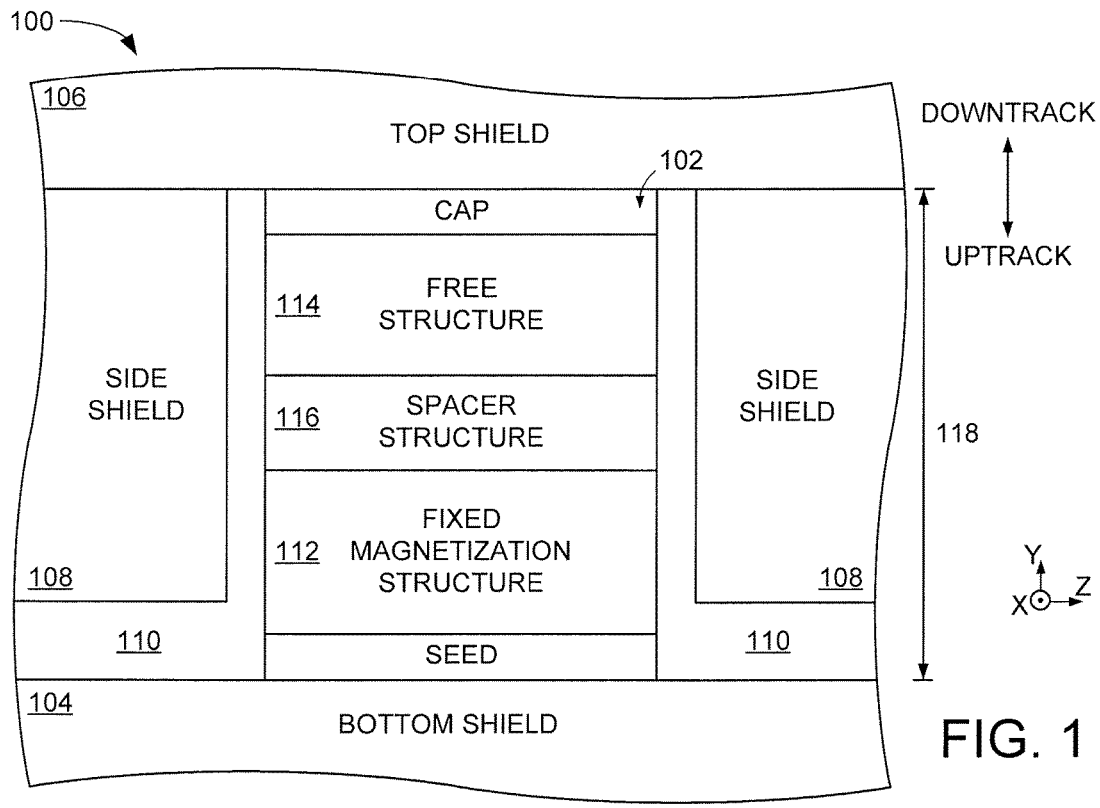
FIG. 1 displays a line representation of a portion of an example data reader constructed and operated in accordance with various embodiments.

FIG. 1 displays an ABS view line representation of a portion of an example data reader 100 that may be employed in a data storage system. In accordance with assorted embodiments, the data reader 100 can have at least one magnetoresistive stack 102 disposed between bottom 104 and top 106 shields as well as between side shields 108. It is noted that the terms "bottom" and "top" are not limiting and are meant to denote relative position either down-track or up-track relative to a data track and the motion of the data reader 100.

The magnetoresistive stack 102 can be separated from the side shields 108 by lateral nonmagnetic layers 110 and separated from the bottom 104 and top 106 shields by conductive cap and seed electrode layers, respectively. The magnetoresistive stack 102 may be configured in a variety of different manners to sense data from an adjacent data storage medium. For example, the magnetoresistive stack 102 may be a spin valve, trilayer lamination without a fixed magnetization, or a lateral spin valve with a fixed magnetization structure 112 separated from a magnetically free structure 114 by a spacer structure 116, as shown.

Decreasing the shield-to-shield spacing (SSS) 118 between the shields 104 and 106 can increase data bit linear resolution of the data reader 100, but can correspond with increased magnetic and thermal volatility that results in degraded performance. In other words, a small SSS 118 decreases the physical size of the various layers of the magnetoresistive stack 102 and the proximity of magnetic shields to the magnetically sensitive portions of the magnetoresistive stack 102, which increases the risk of magnetic volatility that can jeopardize the accuracy of data bit sensing.

Figures 2A, 2B:
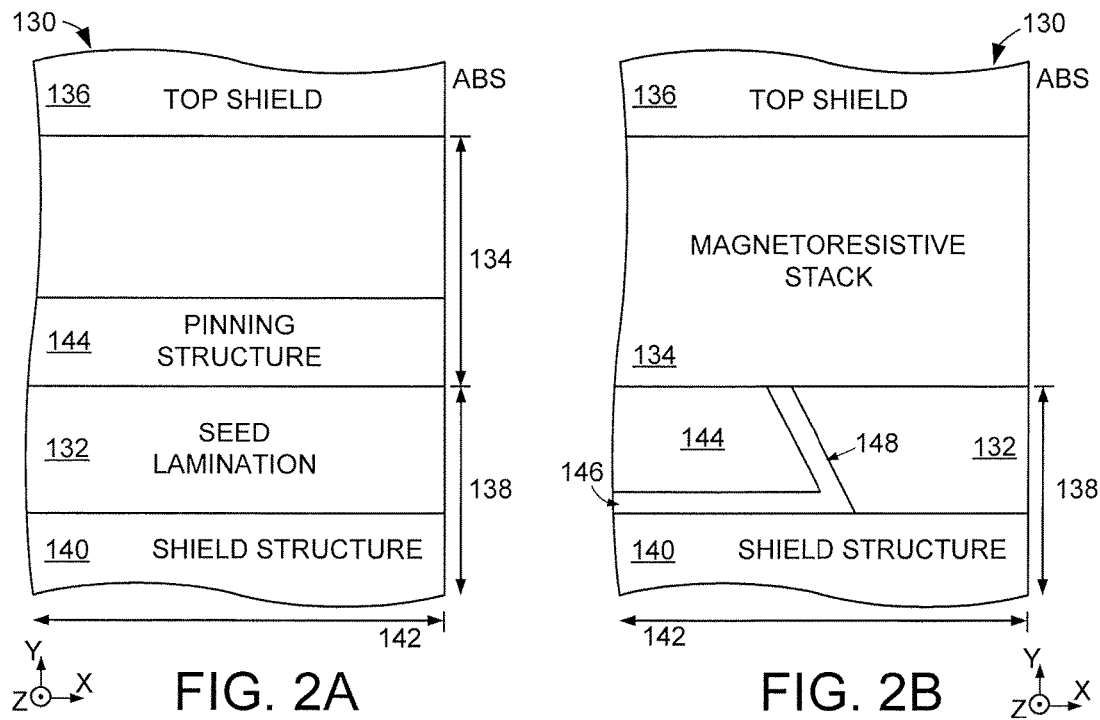
FIGS. 2A and 2B respectively show cross-sectional line representations of portions of an example data reader configured in accordance with some embodiments.

FIGS. 2A and 2B respectively illustrate cross-sectional line representations of portions of an example data reader 130 constructed with a seed lamination 132 in accordance with various embodiments. The data reader 130 in FIG. 2A has a magnetoresistive stack 134 positioned between a top shield 136 and a bottom shield 138 on the ABS. The seed lamination 132 is continuously disposed between the magnetoresistive stack 134 and a bottom shield structure 140 that may be configured as a single magnetic layer or as a lamination of multiple layers.

By tuning the size, shape, and materials of the seed lamination 132, the ability of the bottom shield 138 to absorb and withstand stray magnetic fields from an adjacent media is increased while maintaining a low magnetic coercivity, high anisotropy, and high pinning strength throughout the seed lamination 132. The various aspects of the data reader 130 each have stripe heights 142 that respectively extend from the ABS to a plane distal the ABS along the X axis. While the stripe height 142 of the seed lamination 132 may match or be different than the stripe height 142 of the magnetoresistive stack 134 in some embodiments, other embodiments position a stack pinning structure 144 that shortens the stripe height 142 of the seed lamination 132, as illustrated in FIG. 2B.

In the non-limiting example of FIG. 2B, the pinning structure 144 is continuously separated from the shield structure 140 and seed lamination 132 portions of the bottom shield 138 by a non-magnetic structure 146 that may be one or more contacting layers of similar or dissimilar non-magnetic materials. The pinning structure 144 has a shaped front region 148 that is configured at a non-normal angle with respect to the ABS to provide a balance between shielding on the ABS and the ability to magnetically set a reference magnetization in the magnetoresistive stack 134 with the fixed magnetization of the pinning structure 144.

Hence, the separation distance between the pinning structure 144 and seed lamination 132 can be tuned to provide more, or less, pinning magnetization with respect to the ability of the bottom shield 138 to dissipate magnetic fields from the magnetoresistive stack 134.

Figure 3A:
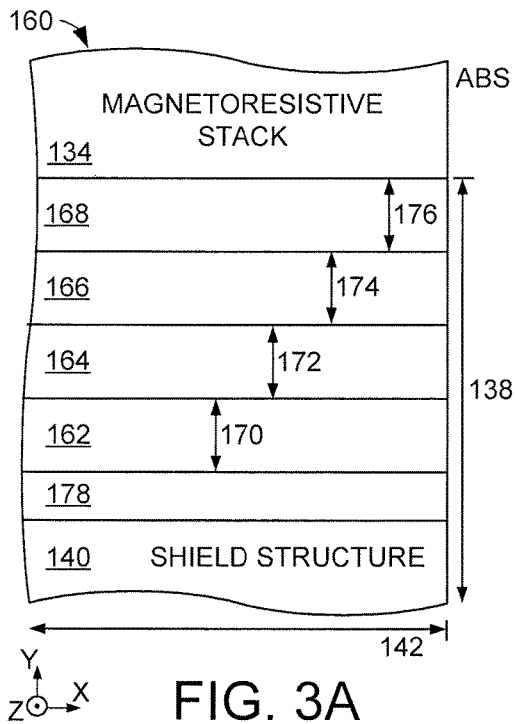
FIGS. 3A and 3B respectively show cross-sectional line representations of portions of an example data reader arranged in accordance with various embodiments.
Figure 3B:
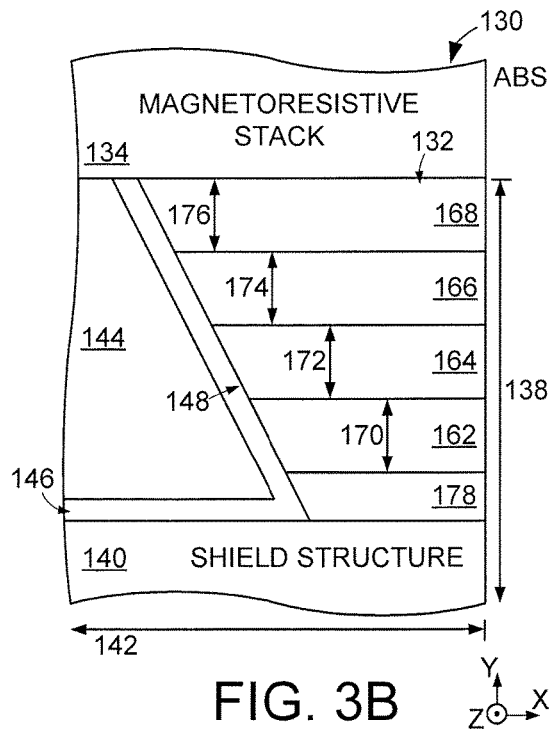

FIGS. 3A and 3B respectively are cross-sectional line representations of portions of an example data reader 160 arranged in accordance with various embodiments to increase magnetic shield performance. FIG. 3A displays how the magnetic seed lamination 132 consists of first 162, second, 164, third 166, and fourth 168 buffer sub-layers that successively separate the magnetoresistive stack 134 from the bottom shield structure 140. While not required or limiting, the first buffer sub-layer 162 is a transition metal material, such as Ta or Ru, that acts as an amorphous buffer for the structure growth for the remaining buffer sub-layers that are formed atop the first buffer sub-layer 162. The thickness of the first buffer sub-layer 162 can be tuned to be less than 30 Angstroms in some embodiments.

It is contemplated that the thickness 170 of the first buffer sub-layer 162 is tuned to a particular distance, such as 10 Angstroms, to provide RKKY coupling between the bottom shield structure 140 and the second buffer sub-layer 164. In some embodiments, the second buffer sub-layer 164 comprises $Ni_xFe_yW_z$ or $Ni_xFe_y$ with X being 20-90%, Y being 10-80%, and Z being 0-6%. The magnetic construction of the second buffer sub-layer 164 can increase the magnetic properties of the third buffer sub-layer 166, such as coercivity and grain structure. The properties of the second buffer sub-layer 164 can be tuned by adjusting the thickness 172 to be 10-100 Angstroms.

The third buffer sub-layer 166 is constructed, in some embodiments, of a magnetic $CoFe_{10}B_4$ material. It is noted that $CoFe_{10}B_4$ provides a higher magnetic moment and higher anisotropy field than other magnetic materials, like NiFeW, which optimizes shield stability while reducing P50 values for the data reader 160. The buffer third sub-layer 166 may also be $Co_xNi_yFe_zB_W$ with X being 0-95%, Y being 0-80%, Z being 0-80%, and W being 0-20% to provide a large magnetic moment. It is noted that the third buffer sub-layer 166 may be constructed of $Co_xFe_yTa_z$ where X is 20-95%, Y is 0-80%, and Z is 0-30%. Along with the material construction, the thickness 174 of the third buffer sub-layer 166 can be tuned to be 25-500 Angstroms to control the amount of magnetic flux in the seed lamination 132.

The fourth buffer sub-layer 168 can be formed of a non-magnetic transition metal material, such as Ta, Ru, NiCr, NiFeCr, or NiRu, in order to decouple the third buffer sub-layer 166 from the magnetic stack 134. The fourth buffer sub-layer 168 can be tuned for thickness 176, such as 10-40 Angstroms, to provide a predetermined texture, such as (111), onto which the magnetoresistive stack 134 can be reliably deposited. The ability to tune the various seed lamination 132 sub-layers for thickness and material allows the bottom shield 138, magnetoresistive stack 134, and data reader 160 as a whole to be customized to balance shielding efficiency, magnetic stability, and magnetic stack 134 sensitivity.

In some embodiments, the shield structure 140 consists of a pinning layer 178 that can be a high magnetic coercivity permanent magnet or an antiferromagnetic material. It is contemplated that the pinning layer, 178 can replace the first buffer sub-layer 162, but such configuration is not required or limiting. Through the tuning of the seed lamination 132 and shield structure 140 portions of the bottom shield 138, magnetic flux in the seed lamination 132 can increase by approximately 84% and the pinning strength of the data reader 160 by approximately 15% without degrading the coercivity and anisotropy of the bottom shield 138.

Figure 4:
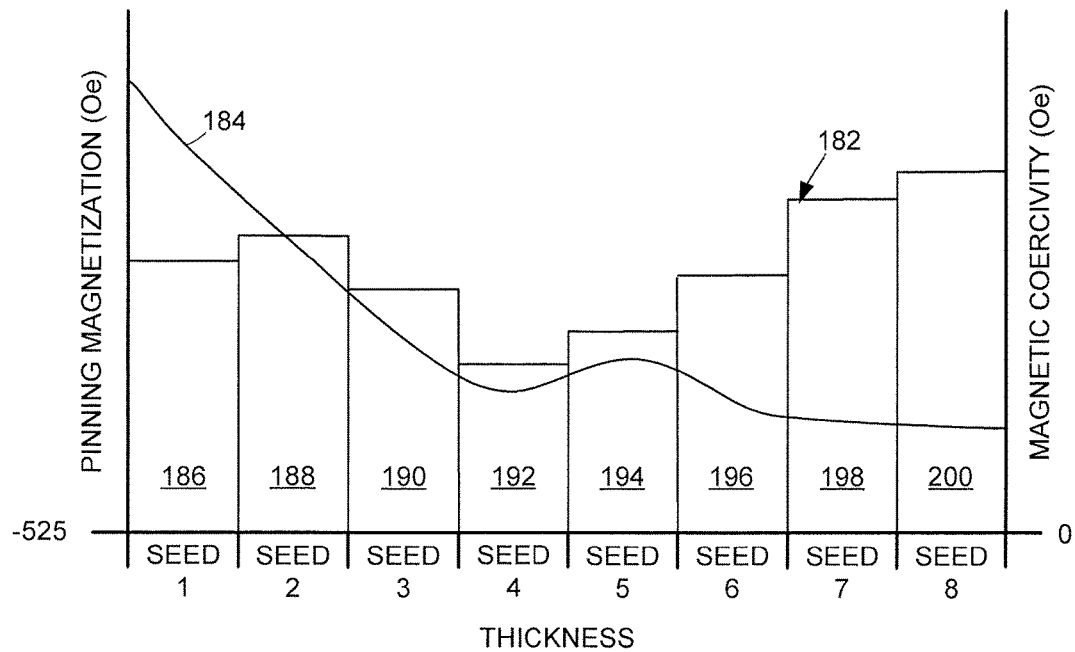
FIG. 4 graphs operational data from example data readers configured in accordance with assorted embodiments.

FIG. 4 plots structural characteristics of assorted data readers with seed laminations tuned with different sub-layer thicknesses. The various bars 182 respectively represent the pinning magnetization of a pinning structure deposited on the seed lamination consisting of a 10 Angstrom Ta first buffer sub-layer and 20 Angstrom fourth buffer sub-layer. In seed 1, as represented by bar 186, the second buffer sub-layer has a 0 thickness and the third buffer sub-layer has a 100 Angstrom thickness to produce approximately a −480 Oe pinning strength. Seed 2 and bar 188 correspond with a 5 Angstrom second buffer sub-layer thickness and a 95 Angstrom third buffer sub-layer thickness.

Bar 190 corresponds with Seed 3 and a 10 Angstrom second buffer sub-layer along with a 90 Angstrom third buffer sub-layer thickness. A 20 Angstrom second buffer sub-layer and 80 Angstrom third buffer sub-layer thicknesses correspond to Seed 4 and bar 192 while bar 194 illustrates how Seed 5 produces approximately −500 Oe pinning strength with a 40 Angstrom second buffer sub-layer thickness and 60 Angstrom third buffer sub-layer thickness. For Seed 6, as shown by bar 196, a 60 Angstrom second buffer sub-layer thickness and 40 Angstrom third buffer layer thickness provide a smaller pinning strength than Seed 7, which corresponds to bar 198 and an 80 Angstrom second buffer sub-layer thickness and 20 Angstrom third buffer sub-layer thickness.

Bar 200 and Seed 8 provide approximately a −450 Oe pinning strength with a 100 Angstrom second buffer sub-layer thickness and a 0 third buffer sub-layer thickness. The assorted second and third buffer sub-layer thicknesses also produce different magnetic coercivity, as illustrated by solid line 184. As such, the thicknesses of the seed lamination sub-layers can be chosen to provide a balance between magnetic coercivity and pinning strength, which can optimize data reader performance despite a reduced SSS 118.

Figure 5:
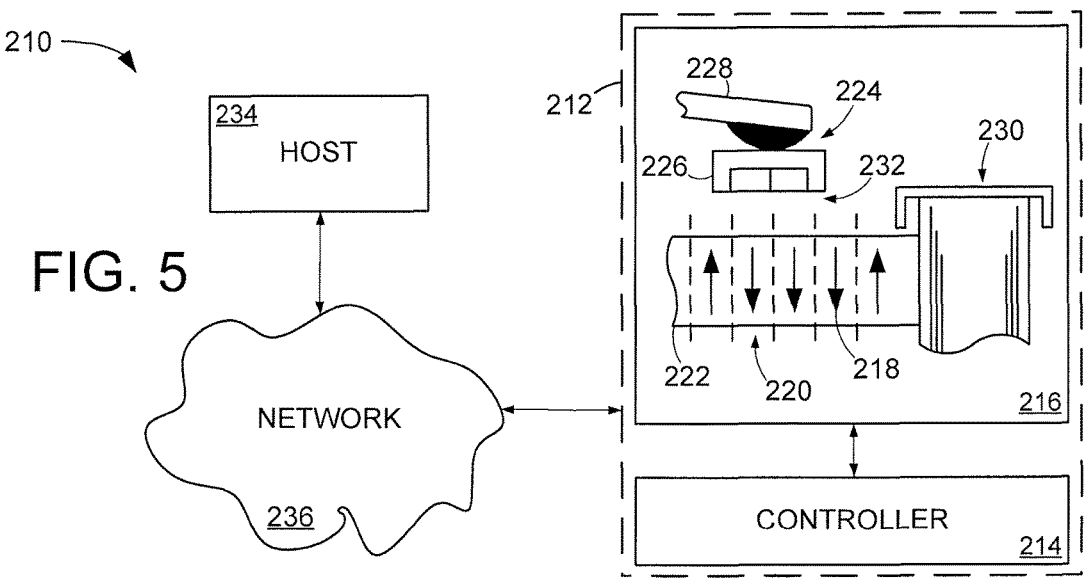
FIG. 5 is a line representation of an example data storage system constructed and operated in accordance with some embodiments.

FIG. 5 displays a block representation of a portion of an example data storage system 210 in which a tuned data reader can be commissioned in accordance with some embodiments. Although not required or limiting, the data storage system 210 can have one or more data storage devices 212 that are configured with at least one data storage means. It is contemplated that various solid-state volatile and non-volatile memories can be used as data storage means.

Assorted embodiments arrange at least one data storage device 212 of the data storage system 210 as a hard disk drive with at least one local controller 214 directing operations of a transducing assembly 216 that consists of a plurality of data bits 218 stored in various data track 220 portions of a data storage medium 222. One or more data bits 218 can be accessed individually, concurrently, and successively by a read head 224 that has a slider 226 suspended from an actuating assembly 228 to present data reader and data writer components. In operation, a spindle 230 can rotate the data storage medium 222 to produce an air bearing 232 on which the slider 226 flies, as directed by the actuating assembly 228 and controller 214.

While the data storage device 212 can operate solely with the local controller 214, various embodiments connect the data storage device 212 with at least one remote host 194 via a wired and/or wireless network 236. The remote connection of the data storage device 212 allows the remote host 234 to provide additional processing, data storage, and security capabilities without impinging on the operation of the data storage device 212. It is contemplated that the data storage system 210 can incorporated any number of data readers that are arranged to provide optimized side shield data reader biasing and shielding structures.

Figure 6:
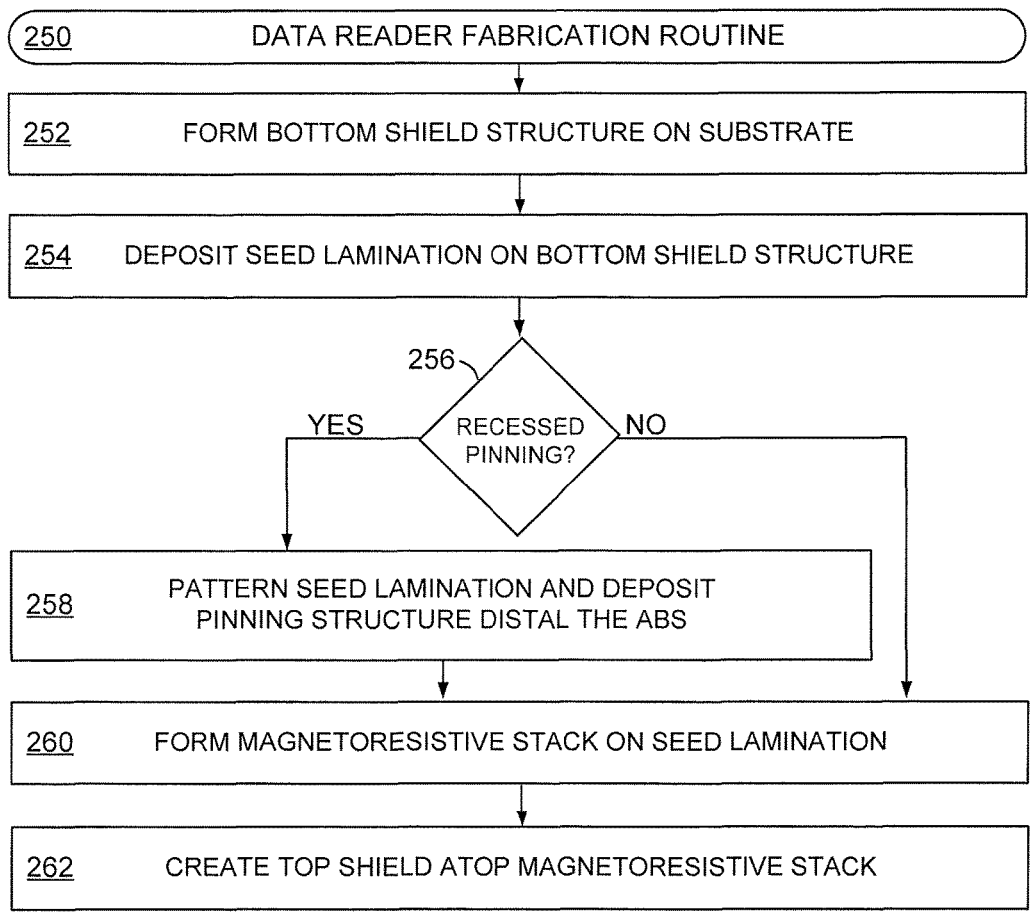
FIG. 6 plots an example data reader fabrication routine carried out in accordance with various embodiments.

FIG. 6 is an example data reader fabrication routine 250 that can be carried out in various embodiments to tune a data reader to provide increased performance. Initially, step 252 forms a bottom shield structure on a substrate. The bottom shield structure can consist of one or more layers, such as the pinning layer 178, on which any number of seed lamination sub-layers are deposited in step 254. That is, all, or less than all, of the seed lamination sub-layers can be deposited prior to decision 256 determining if a recessed pinning structure is to be constructed.

In the event a recessed pinning structure is to be formed, step 258 patterns the previously deposited seed lamination sub-layers, deposits a pinning structure with a shaped front region, and subsequently deposits any remaining seed lamination sub-layers to provide a bottom shield that can be similar to data readers 130 and 160 of FIGS. 2B and 3B. If a recessed pinning structure is not chosen in decision 256 or at the conclusion of step 258, step 260 proceeds to form a magnetoresistive stack on the seed lamination. The magnetoresistive stack can be a variety of different types, such as abutted junction, spin valve, and trilayer types, which may have any number of fixed and free magnetic layers along with any number of non-magnetic layers.

Completion of the magnetoresistive stack advances routine 250 to step 262 where a top shield is created atop the stack. While various embodiments of a data reader have configured the bottom shield with a seed lamination, such arrangement is not required or limiting as the top shield can concurrently or individually be constructed with a seed lamination. Accordingly, the various aspects of routine 250 are merely examples and do not inhibit the addition, removal, or modification of the steps and decision of FIG. 6.

The incorporation of a seed lamination that has a high magnetic moment into a data reader shield can increase linear data resolution for a data reader, such as with P50 reductions. The ability to tune the number of seed lamination sub-layers, materials, and thicknesses can provide a balance between magnetic coercivity and reader pinning strength without degrading cross-track anisotropy. With the ability to incorporate a tuned seed lamination with a pinning structure that contacts the ABS or is recessed from the ABS, shielding characteristics in a data reader can be balanced with the pinning strength and stability to provide optimized performance along with small shield-to-shield spacing.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a magnetoresistive stack separated from a magnetic shield by a seed lamination on an air bearing surface (ABS), the magnetoresistive stack comprising a pinning structure separated from the ABS and the seed lamination, the seed lamination comprising at least three sub-layers with different material compositions.

2. The apparatus of claim 1, wherein the seed lamination is disposed between and contacts the magnetoresistive stack and the magnetic shield.

3. The apparatus of claim 1, wherein the magnetoresistive stack comprises a pinning structure contacting the seed lamination and the ABS.

4. The apparatus of claim 1, wherein the magnetoresistive stack having a greater stripe height from the ABS than the seed lamination.

5. The apparatus of claim 1, wherein a non-magnetic structure continuously extends around the pinning structure to separate the pinning structure from the seed lamination and the magnetic shield.

6. The apparatus of claim 1, wherein the seed lamination and pinning structure each have a shaped front region oriented at a non-normal angle with respect to the ABS.

7. The apparatus of claim 1, wherein each of the at least three sub-layers have different thicknesses as measured parallel to the ABS.

8. An apparatus comprising a magnetoresistive stack separated from a magnetic shield by a seed lamination on an air bearing surface (ABS), the magnetoresistive stack comprising a pinning structure separated from the ABS and the seed lamination, the seed lamination comprising first, second, third, and fourth sub-layers, each sub-layer comprising a different material composition.

9. The apparatus of claim 8, wherein the fourth sub-layer contacts the magnetoresistive stack and comprises a transition metal material.

10. The apparatus of claim 9, wherein the fourth sub-layer comprises NiCr, NiFeCr, or NiRu.

11. The apparatus of claim 8, wherein the first sub-layer contacts the magnetic shield and comprises Ta or Ru.

12. The apparatus of claim 8, wherein the second sub-layer comprises $Ni_XFe_YW_Z$ with X being 20-90%, Y being 10-80%, and Z being 0-6%.

13. The apparatus of claim 8, wherein the second sub-layer comprises $Ni_XFe_Y$ with X being 20-90%, Y being 10-80%.

14. The apparatus of claim 8, wherein the third sub-layer comprises $CoFe_{10}B_4$.

15. The apparatus of claim 8, wherein the third sub-layer comprises $Co_XNi_YFe_ZB_W$ with X being 50-95%, Y being 0-50%, Z being 0-40%, and W being 0-20%.

16. The apparatus of claim 8, wherein the third sub-layer is thicker than any other seed lamination sub-layer, the thickness measured parallel to the ABS.

17. An apparatus comprising a magnetoresistive stack separated from a magnetic shield by a seed lamination on an air bearing surface (ABS), the seed lamination comprising first and second magnetic sub-layers disposed between first and second non-magnetic sub-layers, each sub-layer comprising a different material composition.

18. The apparatus of claim 17, wherein the first and second magnetic sub-layers contact each other on the ABS.

19. The apparatus of claim 17, wherein a magnetic pinning layer is positioned between the seed lamination and the magnetic shield on the ABS.

20. The apparatus of claim 17, wherein a pinning structure is positioned between the seed lamination and the magnetoresistive stack, the pinning structure having a −450 Oe pinning strength.

* * * * *